July 6, 1965
J. M. DODWELL
3,193,067
ONE WAY BAND TYPE CLUTCH
Filed March 18, 1963
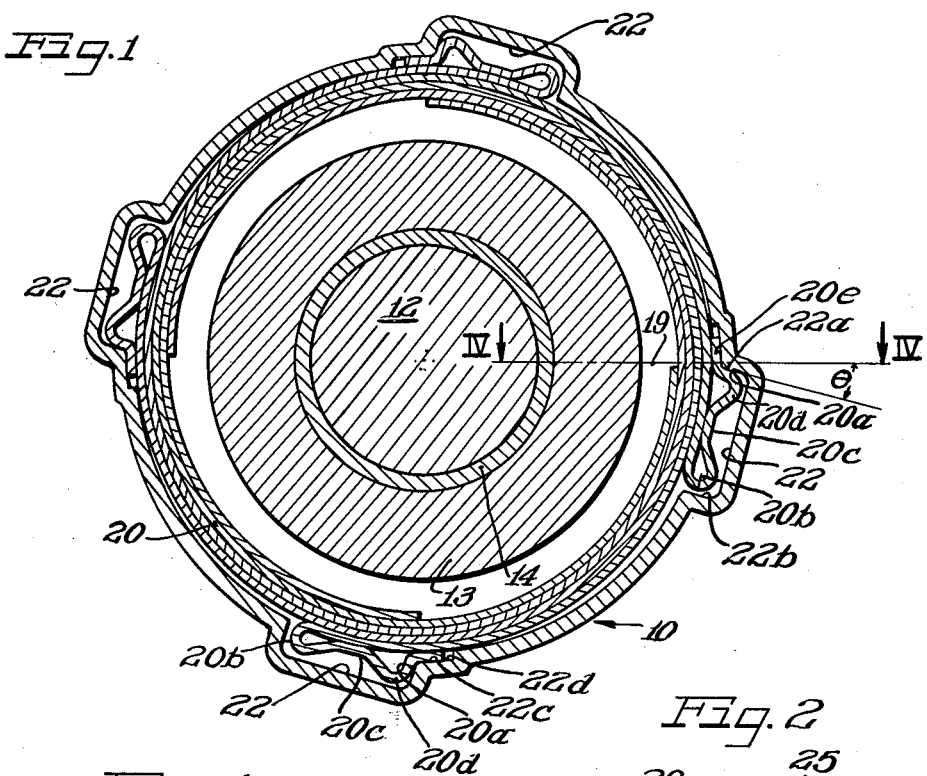
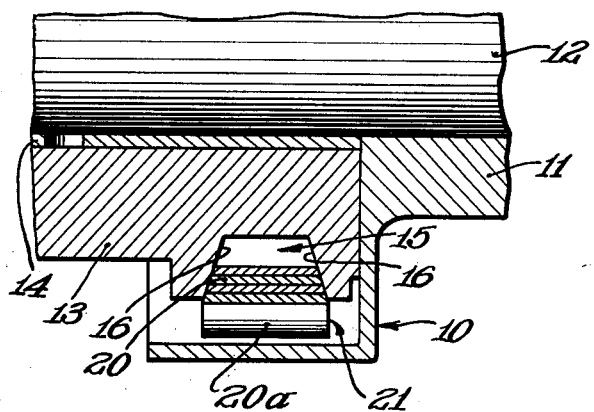
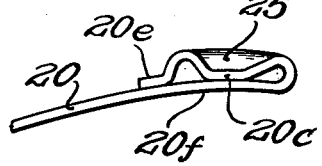
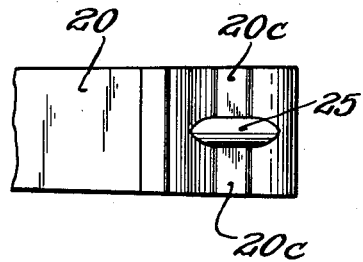
INVENTOR.
John M. Dodwell
BY
ATTORNEYS United States Patent Office 3,193,067
Patented July 6, 1965

3,193,067
ONE WAY BAND TYPE CLUTCH
John M. Dodwell, Piedmont, Quebec, Canada
(2619 N. 5th St., Niles, Mich.)
Filed Mar. 18, 1963, Ser. No. 265,862
10 Claims. (Cl. 192—41)

The present invention relates to improvements in the art of free-wheeling or overrunning clutches and one-way brakes, and is, more particularly, concerned with the provision of a substantially improved clutch of the overlapping torque-transmitting band type generally illustrated in my prior United States Letters Patent No. 2,895,577, issued July 21, 1959.

As has been fully described in my earlier United States Patents, including the above mentioned United States Letters Patent No. 2,895,577, an overrunning or one-way friction device of very satisfactory operational characteristics is provided by utilizing a plurality of overlapping, substantially circular, band secured to a first member and engageable in overlapping fashion in a V-type groove in a second member. As constructed, the torque-transmitting bands are of sufficient natural resiliency to maintain them individually in contact with the side wall surfaces of the V-groove, and, accordingly, the bands wedgingly grip the side walls of the V-groove when the clutch parts are rotated in a direction tending to wrap the bands around the grooved member but tend to expand and slide relative to the walls of the V-groove when the parts are rotated in the opposite direction relative to each other.

While many automotive uses of one-way clutches and brakes actually do not require a clutching capability in excess of one million clutching cycles, nevertheless, an abundance of caution in the automotive industry has suggested the need for a simple one-way clutch capable of successfully surviving more than one million full-load clutching cycles. It has been found, upon testing the improved clutch configuration illustrated in the present invention, that clutching cycles in excess of one million are readily and consistently obtainable from the structure of the present invention. This increase in clutch capability and reliability is without sacrifice of simplicity and is achieved with an extremely inexpensive clutch configuraton.

In accordance with the present invention, each torque-transmitting band is provided with an improved key for co-operation with the clutch housing. In accordance with the invention, the fixed ends of the bands are secured to the band-carrying portion of the clutch housing by means of a radially outwardly projecting portion comprising a reversely bent-over stub at the outer end of the band, which end is brazed or welded to the main body of the band in a manner providing an extremely rigid band key. By providing a substantial radius in the bending operation, the resultant integral band and key exhibits a substantially unstressed condition. In accordance with the present invention, the bent-over portion of the key extends along the band toward its inner ends beyond the torque-transmitting face of the key and is secured to the body of the band at a position ahead, or inwardly of, the torque-transmitting surface. The co-operating casing portions are modified to accommodate this extension without decreasing the compactness of the basic design and, as a result, an improved over-all clutch is provided.

It is, accordingly, an object of the present invention to provide an improved band type one-way friction device.

Another object of the invention is the provision of a superior clutch band and key combination for utilization in a band-type overrunning clutch.

Still another object of the invention is to provide an improved key and keyway combination particularly suitable for utilization in structures manufactured of sheet metal or the like.

A feature of the invention is the construction of a band and key combination in which the band is reversely bent to provide a torque applying surface immediately positioned between sections of bent-over material secured to the main body of the band.

Another feature of the invention is the provision of a co-operating band key and housing keyway particularly adapted to one another.

Still a further object of the invention is to provide an extremely inexpensive band capable of consistent performance.

Still other and further objects and features of the present invention will at once become apparent from a consideration of the attached drawings wherein preferred embodiments are shown by way of illustration only, and wherein:

FIGURE 1 is a cross-sectional view of the overrunning friction device of the present invention;

FIGURE 2 is a side-elevational view of a band of the type employed in the clutch of FIGURE 1 but slightly modified at the key;

FIGURE 3 is a plan view of the key illustrated in FIGURE 2; and

FIGURE 4 comprises a partial cross-sectional view taken along the line IV—IV of FIGURE 1.

As shown on the drawings:

As may be seen from a consideration of FIGURES 1 and 4 of the drawings, the overrunning clutch or brake device of the present invention comprises an outer housing generally indicated at 10 having a hub 11 secured for rotation with shaft 12 by any conventional means. A second hub member 13 is rotatably mounted on the shaft 12 by way of a bushing 14 and is provided with a V-groove generally indicated at 15. The sidewalls 16 of groove 15 co-operate with the side edges of the plurality of resilient metallic bands 20 each provided with a bent-over key portion generally indicated at 21 which co-operates with a respective keyway pocket 22 in the housing 10.

In the embodiment illustrated in FIGURES 1 and 4, each of the four bands 20 is tapered along its length and due to its inherent resiliency, curlingly engages the sidewalls 16 of the V-groove 15. With the individual bands secured, for example, to housing 10, rotation of the housing 10 in a clockwise direction relative to a V-groove hub member, such as 13, moving in the opposite direction, fixed, or moving in the same direction at a slower pace, the bands tend to wrap tightly into the V-groove, locking the housing 10 to the hub 13. Upon reverse movement the bands tend to expand slightly out of engagement with the sidewall of the pulley so that relative movement between the housing and the V-groove member occurs without difficulty.

Torque is transmitted between the bands and the housing 10 by way of torque-transmitting surfaces 20a on each of the bands 20. These surfaces co-operate with complementary surfaces 22a. As may be seen from FIGURE 1, the torque-transferring surfaces 20a and 22a lie at an angle θ relative to a radius line generally indicated at 19. The angle θ may approximate 15° and this angled relationship provides a component of force causing the band 20 to move deeper into the V-groove 15. Upon attempted rotation of the parts in opposite directions of rotation, the rear surface 22b of each pocket 22 co-operates with the end 20b of each band, acting upon it to cause its unwrapping relative to the V-groove 15.

In the improved construction of the present invention, each of the bands 20 is reversely bent over at its outer end 20b in a smooth radius bend. The bent-over portion is returned to a position of contact with the body of the band at 20c and returns outwardly to form the projection 20c having the torque-transmitting surface 20a thereon. The bent-over portion then returns to the body of the band for contact therewith at 20e. The contacting portions 20c and 20e are brazed or spot-welded to provide rigid securement between the bent-over portion and the body of the band both fore and aft of the torque-transmitting surface. A slight taper may then be given the completed band, along the length of the band, to permit its spirally wrapping into contact with the edges of the V-groove 15.

As may be seen from a consideration of FIGURE 1, the projecting portion 20e of the teeth integral with the bands, is accommodated by recess 22c in the individual pockets 22. A slight space 22d is provided immediately ahead of the projection 20e of the band key to accommodate slight peripheral motion of the band as the torque-transferring surface 20a slides radially and peripherally forward on their clutching action.

A slight modification is shown in the band construction in FIGURES 2 and 3. There, a longitudinal rib 25 is deflected upwardly relative to the contacting portion 20c. This rib will act as an additional stiffner tending to maintain at all times the slight curvature indicated at 20f in the band 20. Although only a single deformed rib 25 is illustrated, it is, of course, clear that two or more may be employed, spaced by portions 20c in contact with the main body of the band and brazed or otherwise welded thereto.

It will be thus apparent to those skilled in the art that I have provided a novel and extremely simple and inexpensive one-way friction device capable of operating for many hundreds of thousands of cycles without fatigue failure of the clutching parts. This clutch may be employed for numerous uses, including one-way brake utilization in automotive transmissions, automotive starting motor clutches, electrical switches and any other mechanism requiring only one-way clutching or braking. While four bands have been illustrated in the clutch form shown in the drawings of the present application, it is intended that one or more bands may be employed in any given installation and it is not intended that the number of bands illustrated limit the invention of the present application in any way. Since it will, of course, be apparent that still further modifications and variations may be made in the structure described above without departing from the scope of the novel concepts of the present invention, it is my intention that the scope of the present invention be limited solely by that of the hereinafter appended claims.

I claim as my invention:

1. A friction device comprising a first member having an externally facing peripheral V-groove therein, a second member having a plurality of internally facing pockets positioned adjacent and over said groove, a plurality of torque-transmitting bands each being pre-curved to wrappingly engage the sidewalls of said V-groove, and means securing one end of each of said bands in a respective pocket, said means comprising a portion of the said one end of each said band bent reversely thereupon and corrugated to form a radially outwardly projecting portion between longitudinally spaced portions lying against the body of the band, and means integrally securing said spaced portions to the body of the band immediately thereunder, said projecting portion and its respective pocket having contacting torque-transmitting surfaces.

2. A friction device comprising a first member having an externally facing peripheral V-groove therein, a second member having a plurality of internally facing pockets positioned adjacent and over said groove, a plurality of torque-transmitting bands each being pre-curved to wrappingly engage the sidewalls of said V-groove, and means securing one end of each of said bands in a respective pocket, said means comprising a portion of the said one end of each said band bent reversely thereupon and corrugated to form a radially outwardly projecting portion between longitudinally spaced portions lying against the body of the band, and means integrally securing said spaced portions to the body of the band immediately thereunder, said projecting portion and its respective pocket having contacting torque-transmitting surfaces, each said pocket having a cut-out portion in said contacting torque-transmitting surface to accommodate that portion of the reversely bent part of the band integrally secured to the band longitudinally ahead of the radially outwardly projecting portion.

3. A friction device comprising a first member having an externally facing peripheral V-groove therein, a second member having a plurality of internally facing pockets positioned adjacent and over said groove, a plurality of torque-transmitting bands each being pre-curved to wrappingly engage the sidewalls of said V-groove, and means securing one end of each of said bands in a respective pocket, said means comprising a portion of the said one end of each said band bent reversely thereupon and corrugated to form a radially outwardly projecting portion between longitudinally spaced portions lying against the body of the band, and means integrally securing said spaced portions to the body of the band immediately thereunder, said projecting portion and its respective pocket having contacting torque-transmitting surfaces, each said pocket having a cut-out portion in said contacting torque-transmitting surface to accommodate that portion of the reversely bent part of the band integrally secured to the band longitudinally ahead of the radially outwardly projecting portion, each said pocket having a peripheral length accommodating said projecting portion and the said one end of the band.

4. A clutch band for a one-way V-groove friction device comprising an elongated thin spring metal strip pre-curved into a generally flat spiral shape tapered in width along its length from adjacent its outer end to its inner end to provide a pair of progressively closer side edges for progressively deeper co-operation with the sidewalls of a V-groove, key means formed integrally at the outer end of the band and comprising an outwardly and backwardly bent section forming an outwardly projecting portion between longitudinally spaced portions depressed relative to said outwardly projecting portion and lying against and welded to the outer surface of the band lying immediately thereunder.

5. A clutch band for a one-way V-groove friction device comprising an elongated thin spring metal strip pre-curved into a generally flat spiral shape tapered in width along its length from adjacent its outer end to its inner end to provide a pair of progressively closer side edges for progressively deeper co-operation with the sidewalls of a V-groove, key means formed integrally at the outer end of the band and comprising an outwardly and backwardly bent section forming an outwardly projecting portion between longitudinally spaced portions depressed relative to said outwardly projecting portion and lying against and brazed to the outer surface of the band lying immediately thereunder.

6. A clutch band for a one-way V-groove friction device comprising an elongated thin spring metal strip pre-curved into a generally flat spiral shape tapered in width along its length from adjacent its outer end to its inner end to provide a pair of progressively closer side edges for progressively deeper co-operation with the sidewalls of a V-groove, key means formed integrally at the outer end of the band and comprising a section bent outwardly and backwardly from the band on a substantial radius to form an outwardly projecting portion between longitudinally spaced portions depressed relative to said outwardly projecting portion and lying against the outer surface of the band and welded thereto.

7. A clutch band for a one-way V-groove friction device comprising an elongated thin spring metal strip precurved into a generally flat spiral shape tapered in width along its length from adjacent its outer end to its inner end to provide a pair of progressively closer side edges for progressively deeper co-operation with the sidewalls of a V-groove, key means formed integrally at the outer end of the band and comprising a section bent outwardly and backwardly from the band on a substantial radius to form an outwardly projecting portion between longitudinally spaced portions depressed relative to said outwardly projecting portion and lying against the outer surface of the band and brazed thereto.

8. A clutch band for a one-way V-groove friction device comprising an elongated thin spring metal strip precurved into a generally flat spiral shape tapered in width along its length from adjacent its outer end to its inner end to provide a pair of progressively closer side edges for progressively deeper co-operation with the sidewalls of a V-groove, key means formed integrally at the outer end of the band and comprising a section bent outwardly and backwardly from the band on a substantial radius to form an outwardly projecting portion between longitudinally spaced portions lying against the outer surface of the band and welded thereto, and the portion between said radius and said outwardly projecting portion having a longitudinally extending rib thereon providing rigidification longitudinally of the key means.

9. A clutch band for a one-way V-groove friction device comprising an elongated thin spring metal strip precurved into a generally flat spiral shape tapered in width along its length from adjacent its outer end to its inner end to provide a pair of progressively closer side edges for progressively deeper co-operation with the sidewalls of a V-groove, key means formed integrally at the outer end of the band and comprising a section bent outwardly and backwardly projecting portion between longitudinally spaced portions lying against the outer surface of the band and brazed thereto, and the portion between said radius and said outwardly projecting portion having a longitudinally extending rib thereon providing rigidification longitudinally of the key means.

10. A clutch comprising a first member having an externally facing peripheral V-groove therein, a second member having at least one internally facing pocket positioned adjacent and over said groove, a torque-transmitting band associated with each pocket and curved to wrappingly engage the sidewalls of said V-goove, and means securing one end of each said band in a respective pocket, said means comprising an outwardly projecting portion fixed to said one end and positioned in the respective pocket, said projecting portion and its respective pocket having complementary, substantially straight contacting torque-applying surfaces both of which are inclined at an angle to a radial line drawn through a straight line of said surfaces and the axis of rotation of said members, said one end of said band having an outwardly projecting portion in the form of a transverse ridge portion between a pair of longitudinally spaced portions depressed relative to said outwardly projecting portion and lying against and integrally secured to the body of the band.

References Cited by the Examiner
UNITED STATES PATENTS 2,422,533   6/47   Dodwell.
2,895,577   7/59   Dodwell.

DAVID J. WILLIAMOWSKY, *Primary Examiner.*